March 12, 1957 J. O. TRINKLE 2,784,834
CONVEYOR FOR HOT MATERIAL
Filed July 22, 1952

Inventor
James O. Trinkle
By Harold S. Meyer
Atty.

United States Patent Office 2,784,834
Patented Mar. 12, 1957

2,784,834

CONVEYOR FOR HOT MATERIAL

James O. Trinkle, Detroit, Mich., assignor to The B. F. Goodrich Company, New York, N. Y., a corporation of New York Application July 22, 1952, Serial No. 300,266

2 Claims. (Cl. 198—184)

This invention relates to apparatus for conveying hot material and is especially useful where flexible belts of rubber material are employed in conveying hot materials such as cinders, foundry sand and other bulk materials.

Heretofore conveyor belts for handling hot materials have been constructed of fabric or cords to provide flexibility and resistance to stretch bonded together by rubber material. The conveyor belt has been trained about driving and idler pulleys to provide a load-carrying reach generally supported by troughing or idler pulleys. The load-supporting face of the belt has been provided with a heat-resistant wear-resisting layer of rubber material for contacting the hot material.

While compositions of rubber material having high resistance to heat have been developed for providing a thick load-contacting layer at the face of such belts, such material in time hardens and cracks under the constant application of heat.

It is an object of the present invention to provide a belt having longer life when exposed to contact with heated materials.

Other objects are to provide a belt having opposite load-contacting faces of heat-resistant material, to provide for alternate heating and cooling of the load-contacting faces and to provide greater wear resistance.

These and other objects will appear from the following description and the accompanying drawings.

Figure 3:
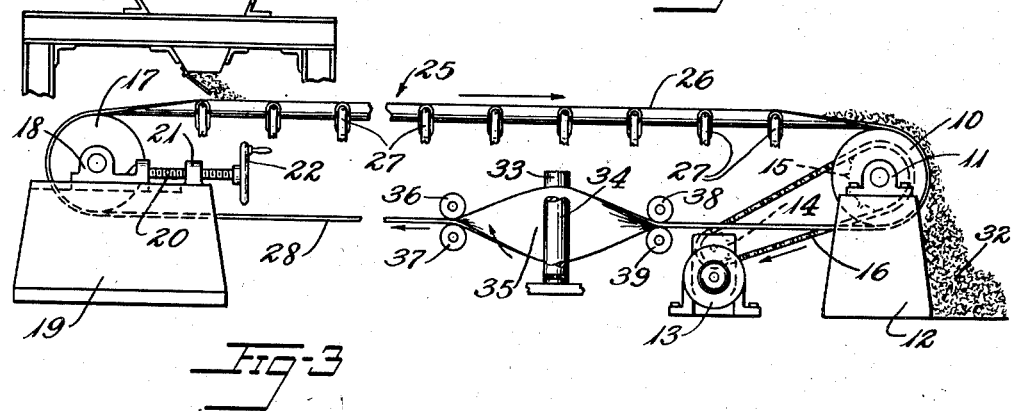
Fig. 3 is a side elevation of a conveyor constructed in accordance with and embodying the invention.

Referring to the drawings, and first to Fig. 3, which shows one application of the invention, a driven belt-supporting pulley 10 is supported for rotation on pillow blocks 11, one at each side of the pulley mounted on a fixed support 12. The electric motor 13 drives pulley 10 through sprockets 14, 15 secured respectively to the motor shaft and the pulley shaft, and a drive chain 16. A tension pulley 17 is rotatably supported on a movable carriage 18 slideably mounted on a fixed support 19. An adjusting screw 20 has threaded engagement with a nut 21 on the support 19 and may be operated by a hand wheel 22 for tensioning a belt trained about pulleys 10 and 17. The belt 25 has an upper load-carrying reach 26, which may be supported in troughed form, if desired, by troughing rollers 27 of usual construction, and a lower return reach 28.

Hot material 30 may be delivered to the load-carrying reach of the belt, as by a hopper 31 and my be delivered onto a pile 32 adjacent the drive pulley 10. It is an object of this invention to carry the hot material alternately on opposite faces of the belt and for this purpose, the belt is provided with a heat resisting cover on opposite faces thereof and provision is made for exposing these heat-resisting faces alternately to the hot material thereby permitting each face of the belt to cool during one half of the operating period. For this purpose, the belt 25 is provided with a permanent 180 degree twist 35 and is so placed on pulleys 10 and 17, that the upper load-carrying reach is straight whereas the twist 35 is in the lower return reach of the belt, as shown. With this construction, the upper load-carrying face of the upper reach of the belt turns after delivering its load at pulley 10 and becomes the pulley-contacting face at the pulley 17 thereby providing the opposite face of the belt as the next load-contacting face and permitting the face which previously contacted the material to cool.

For guiding the belt at the turning position, three pairs of guide rollers 33, 34, 36, 37 and 38, 39 may be provided at the turning position, one pair of vertical rollers 33, 34 being positioned midway between the two pairs of horizontal rollers 36, 37 and 38, 39, one roller of each pair of horizontal rollers being above and one below the return reach and the pairs being located a sufficient distance apart to permit the twist 35 to take place therebetween without excessive stretch of the outer margins of the belt. Rolls 33, 34 aid in supporting the belt at the twist 35.

Figure 1:
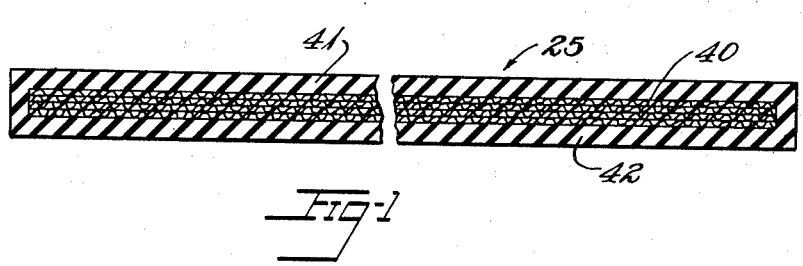
Fig. 1 is a cross-sectional view of a belt constructed in accordance with and embodying the invention.
Figure 2:
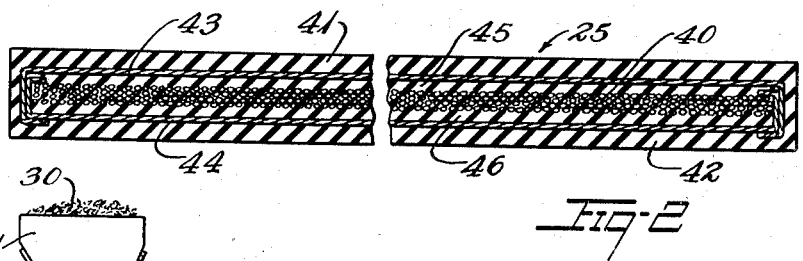
Fig. 2 is a similar cross section of a modified belt construction.

The conveyor belt 25 may have a textile tension resisting body 40 of any desired construction, on each face of which are wear-resisting load-carrying layers 41 and 42 of heat-resistant rubber material of substantially equal thickness. As shown in Fig. 1 the tension-resisting body can suitably be made of a plurality of plies of square woven fabric which may be of cotton, rayon, nylon, glass fiber or metallic wire material. While this body is shown as of raw-edge plied material, it is within the invention to construct this body with folded margins to enclose it within a ply of material folded thereabout. The belt shown in Fig. 2 has the body 40 of a plurality of plies of parallel cords extending lengthwise of the belt. To provide lateral strength and resistance to shock due to heavy lumps of material dropped upon the face of the belt as well as to prevent growth of cracks in the heat-resistant face layers 41, 42, breaker layers 43, 44 of laterally extending cords are located in the rubber material between the heat resistant rubber face layers and the textile body and are cushioned by layers of cushion rubber 45, 46 therebetween. The margins of the breaker layers may be folded about the margins of the body 40 as shown to give them good anchorage. These constructions of the belt are only examples of belts suitable for use with the invention and other belts having opposite heat-resistant faces may be employed.

In splicing the belt for use, one of the ends of the belt is twisted 180 degrees before splicing to the other end.

In operation, the belt turns over once during each passage of the belt about the pulleys, thereby alternately presenting its opposite heat-resistant faces to carry the hot material.

While the embodiment of the invention shown in Fig. 3 has the belt shown as horizontal, it will be understood that the conveyor may be inclined and that other arrangements of guide pulleys and driving mechanism may be employed without departing from the invention.

I claim:

1. Apparatus for conveying hot material, said apparatus comprising a driven head pulley, a tail pulley spaced from the head pulley, an endless flat flexible conveyor belt trained around both said pulleys to provide an upper load-carrying reach and a lower return reach between said pulleys, said belt having a tension-resisting body and layers of heat-resistant rubber-like material of substantially equal thickness on opposite sides of said body providing load-contacting faces on opposite sides of the belt, both said faces in the return reach and also the face of the upper reach nearest the return reach being exposed to the ambient atmosphere for transfer of heat thereto, and said belt in said return reach having a face-reversing twist about the longitudinal axis of the belt for alternately inverting the faces of the load-carrying reach presented to the hot material, both terminal regions of the twisted portion of the belt being disposed beneath said upper reach, a pair of guide rollers straddling the twisted portion of the belt intermediate said terminal regions thereof, other rollers spaced from and flanking said pair of guide rollers and supporting the return reach of said belt at the terminal regions of said twisted portion, a hot material loading mechanism for delivering hot material onto the load-carrying reach as said faces are alternately presented for reception of hot material by virtue of the twist in said lower reach, and means for driving said head pulley to continuously advance said belt lengthwise around said pulleys thereby conveying hot material delivered onto said load-carrying reach toward a discharge point adjacent said head pulley.

2. Apparatus for conveying hot material, said apparatus comprising a driven head pulley, a tail pulley spaced from the head pulley, an endless flat flexible conveyor belt trained around both said pulleys to provide an upper load-carrying reach and a lower return reach between said pulleys, said belt having a tension-resisting body and layers of heat-resistant rubber-like material of substantially equal thickness on opposite sides of said body providing load-contacting faces on opposite sides of the belt, both said faces in the return reach and also the face of the upper reach nearest the return reach being exposed to the ambient atmosphere for transfer of heat thereto, and said belt in said return reach having a face-reversing twist about the longitudinal axis of the belt for alternately inverting the faces of the load-carrying reach presented to the hot material, the terminal regions of the twisted portion of the belt being in the common plane of the non-twisted adjacent portions of said return reach, a pair of guide rollers disposed generally perpendicularly to said common plane of the return reach and straddling the twisted portion of the belt intermediate said terminal regions thereof, other rollers spaced from and flanking said pair of guide rollers at each said terminal regions of said twisted portion with the axis of rotation of the latter rollers parallel to said common plane of the untwisted portions of the return reach, a hot material loading mechanism arranged adjacent said tail pulley for delivering hot material onto the load-carrying reach as said faces are alternately presented for reception of hot material by virtue of the twist in said lower reach, and means for driving said head pulley to continuously advance said belt lengthwise around said pulleys thereby conveying hot material delivered onto said load-carrying reach toward a discharge point adjacent said head pulley.

References Cited in the file of this patent
UNITED STATES PATENTS

| | | |
|---|---|---|
| 913,917 | Robins | Mar. 2, 1909 |
| 1,578,727 | Harshton | Mar. 30, 1926 |
| 2,293,977 | Hoffstetter | Aug. 25, 1942 |
| 2,431,207 | Stephens | Nov. 18, 1947 |

FOREIGN PATENTS

| | | |
|---|---|---|
| 481,923 | Great Britain | Mar. 21, 1938 |